Oct. 28, 1930. W. E. ROBINSON 1,779,917
WHEEL
Filed May 28, 1928

WITNESS:
Rob't R. Mitchel

INVENTOR
William E. Robinson
BY
Augustus B. Stoughton.
ATTORNEY.

Patented Oct. 28, 1930

1,779,917

UNITED STATES PATENT OFFICE

WILLIAM E. ROBINSON, OF PHILADELPHIA, PENNSYLVANIA

WHEEL

Application filed May 28, 1928. Serial No. 281,207.

The present invention relates to wheels and more particularly to spring or shock absorbing wheels.

The principal object of the present invention is to provide an effective and efficient wheel of the type indicated which shall be strong, durable and of comparatively simple yet reliable construction and which will be possessed of smooth running properties.

Other objects of the invention will appear from the following description at the end of which the invention will be claimed.

Generally stated, the invention comprises hub and tread elements, non-elastic suspension members arranged transversely of the plane of and interposed in spaced relation between said elements, and spring means for keeping said members in tension.

The invention also comprises the improvements to be presently described and finally claimed.

In the following description reference will be made to the accompanying drawing forming part hereof and in which Figure 1 is a side view of a wheel embodying features of the invention.

Figure 1:
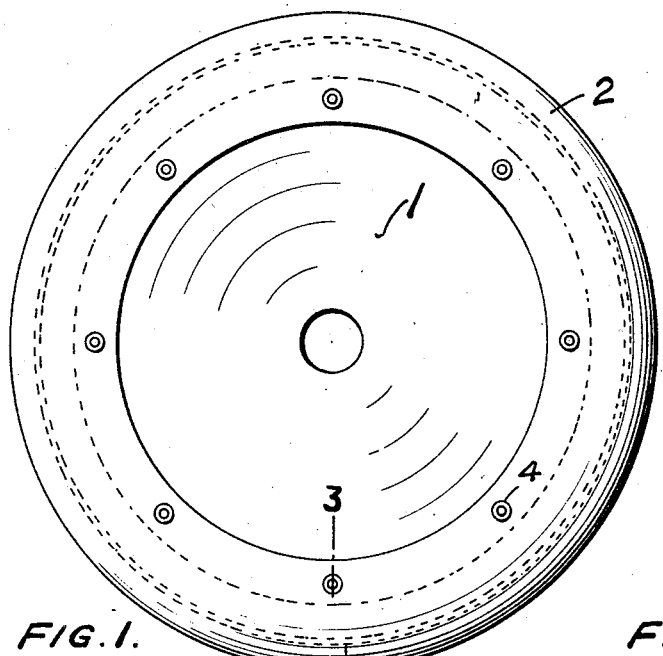
Figure 2:
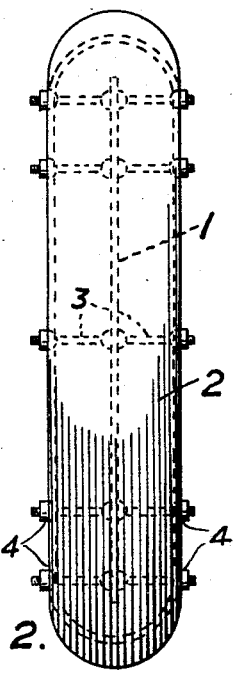
Fig. 2 is an edge view of the same.
Figure 3:
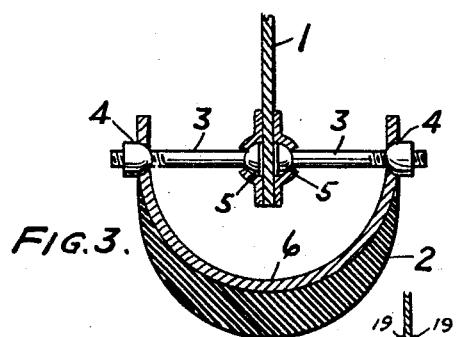
Fig. 3 is a sectional view drawn to an enlarged scale and taken on the line 3—3 of Fig. 1.

In the drawings, Figs. 1 to 3, 1 is a hub element and 2 is a tread element confronting opposite faces of the hub element. The hub element happens to be illustrated as a disk extending to the center but of course the extension to the center may consist of spokes which construction is too well understood to require illustration or further description.

There are non-elastic suspension members 3 arranged transversely of the plane and interposed in spaced relation between the confronting portions of said elements. As shown there are provided ball and socket connections 4 and 5 at the ends of the suspension members 3 where they are connected with the confronting portions of the hub and tread elements. 6 indicates spring means acting upon the balls of the joints 4 which are connected to the suspension members 3, and keeping the suspension members in tension. The spring means 6 happen to be a portion of the tread element, the other portion of which is indicated as of rubber or like material.

Evidently shocks imparted to the wheel are absorbed by the spring means 6, and the ball and socket joints facilitate the relative movements of the parts. If we assume that Fig. 3 shows the normal relation of the parts with the spring means 6 under some tension, it is evident that the suspension members 3 may turn about the joints 4 and 5 in any direction, but under the restraint of the spring means 6, which, as has been said, absorb shocks and jars.

Figure 4:
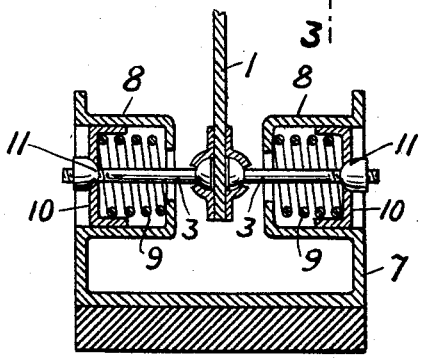
Figs. 4, 5 and 6 are views generally similar to Fig. 3 but illustrating modifications.

The construction and mode of operation of the modification shown in Fig. 4 are as above described except that the tread portion 7 is not resilient and is provided with housings 8 in which are arranged compression springs 9 fitted with heads 10 movable in the housings 8 and bearing upon the balls of the joints 11 by which the suspension members 3 are connected with the tread portion.

Figure 5:
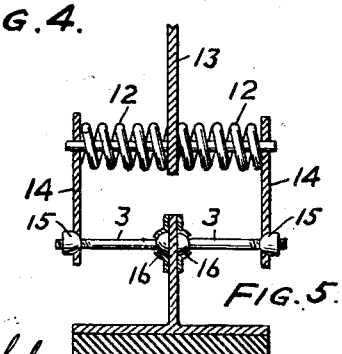

The construction and mode of operation of the modification shown in Fig. 5 are as above described except that springs 12 are interposed between the hub member or disk 13 and rings 14 in turn engaged by the ball joints 15 by which the suspension members 3 are connected at one of their ends. The other ends of the suspension members 3 are connected by ball and socket joints 16 with a flange on the tread portion.

Figure 6:
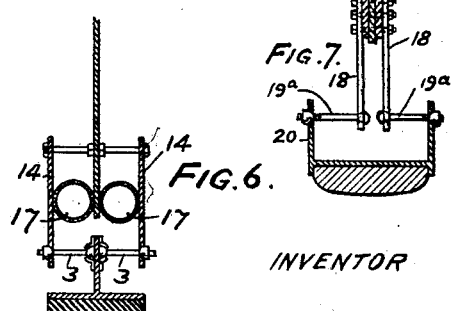

The foregoing description applies to Fig. 6 with the exception that compressible resilient tubes 17 are substituted for the springs 12.

Figure 7:
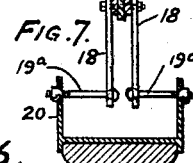
Fig. 7 is a similar view illustrating another modification.

In Fig. 7, the spring means in the form of spring bars 18, are attached to and radiate from the hub element 19, and the non-elastic suspension members 19ª, are interposed between the springs 18, and the tread element 20.

It will be obvious to those skilled in the art to which the invention relates that modifications may be made in details of construction and arrangement and matters of mere form without departing from the spirit of the invention which is not limited to such matters or otherwise than the prior art and the appended claim may require.

I claim:

A wheel comprising a hub element, a circular tread element of semicircular radial cross section surrounding the periphery of said hub element so as to confront the opposite faces of said hub element, non-elastic suspension members aligned in pairs on opposite sides of the hub element, ball and socket joints for connecting one end of each suspension member with the hub element, ball and socket joints for connecting the other ends of the suspension elements with the portions of the tread element which confront the hub element, a resilient tire element on the outer side of said tread element, and said tread element forming a spring for keeping said suspension members in tension.

WILLIAM E. ROBINSON.